No. 712,715. Patented Nov. 4, 1902.
L. PETICH.
ELECTROMEDICAL APPARATUS.
(Application filed Mar. 11, 1901.)
(No Model.) 2 Sheets—Sheet 1.
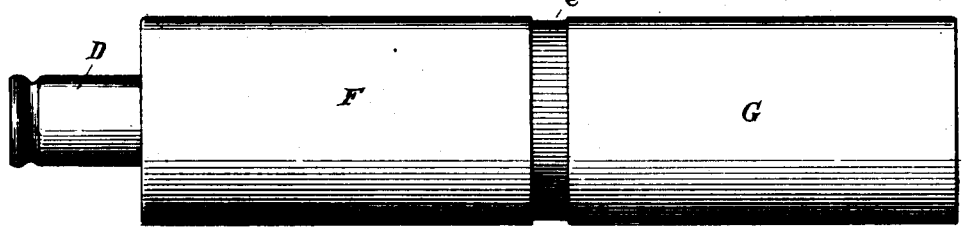
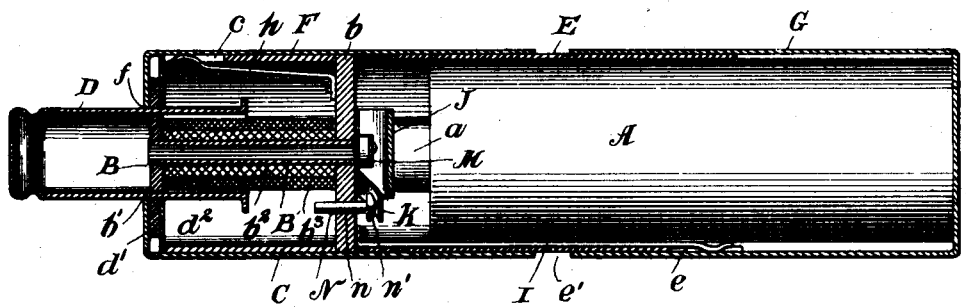
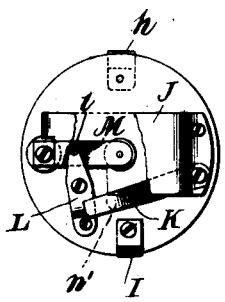
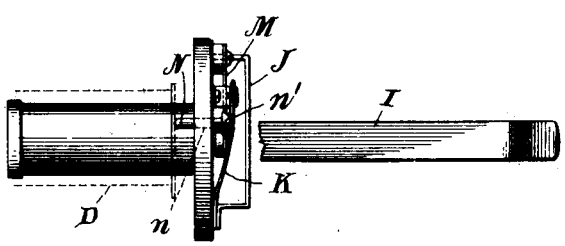
WITNESSES: INVENTOR
Louis Petich
BY
ATTORNEY No. 712,715. Patented Nov. 4, 1902.
L. PETICH.
ELECTROMEDICAL APPARATUS.
(Application filed Mar. 11, 1901.)
(No Model.) 2 Sheets—Sheet 2.
Fig. 7.
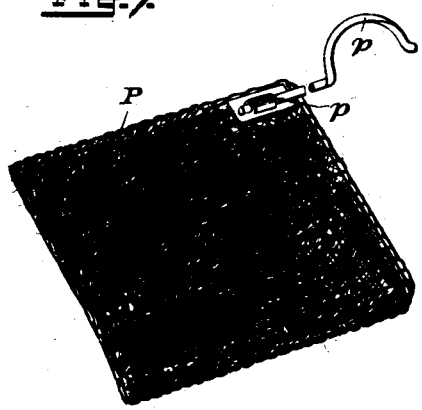
Fig. 5. Fig. 6.
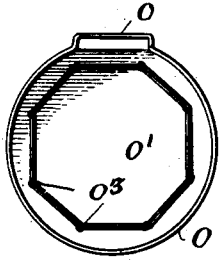 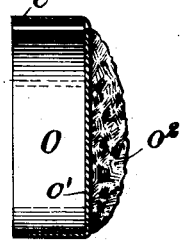
Fig. 8. Fig. 9. Fig. 10.
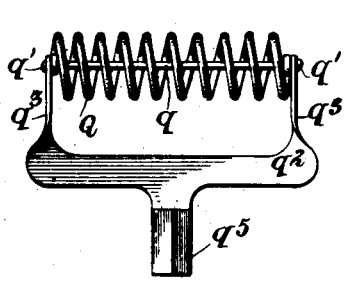 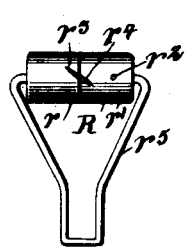 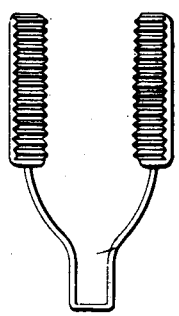
Fig. 11. Fig. 12.
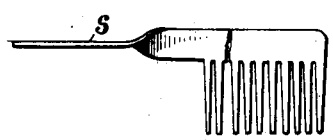 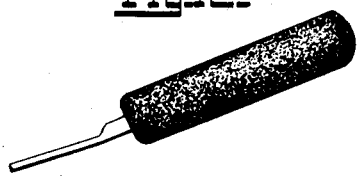
WITNESSES:
Geo. W. Naylor
Max Enslin
INVENTOR
Louis Petich
BY
ATTORNEY
THE NORRIS PETERS CO., PHOTO-LITHO., WASHINGTON, D. C.

UNITED STATES PATENT OFFICE.

LOUIS PETICH, OF NEW YORK, N. Y.

ELECTROMEDICAL APPARATUS.

SPECIFICATION forming part of Letters Patent No. 712,715, dated November 4, 1902.

Application filed March 11, 1901. Serial No. 50,711. (No model.)

*To all whom it may concern:*

Be it known that I, LOUIS PETICH, a subject of the King of Italy, residing in the borough of Manhattan, in the city, county, and State of New York, have invented a new and useful Improvement in Electromedical Apparatus, of which the following is a specification.

This invention relates to electrical devices for treatment of the human body with electricity and in some instances with the absorption of medical salts; and my improvements consist in the novel construction and arrangement of the constituent parts, which include positive and negative electrodes in cylindrical form, the same covering and containing a battery, a magnetic core with primary and secondary induction-coils, a movable sheath about the electromagnet, and a switch, as a spring-contact, which operates automatically to make or break contact, according to the manipulation of the sheath. Further, my invention includes means permitting the utilization of such a device to impart an electric current direct to the parts affected or to be treated without the employment of distant terminals or of intermediary wires, the device also being arranged as a holder for auxiliary special contact appliances, such as a comb, a massage-roller, a bipart nose-contact, a moisture-containing contact, either medicated or otherwise, a contact for the cavities of the body, and supplemental positive and negative electrode foot-pads.

In order that my said invention may be explained in detail, I have annexed drawings hereto, in which—

Figure 1 is a side elevation of my apparatus. Fig. 2 is a longitudinal section thereof. Figs. 3 and 4 are detail views of the induction-coil and contact devices. Fig. 5 is an end view of an attachment-holder adapted to be fitted onto the end of one of the electrodes. Fig. 6 is a side view of the same, showing a sponge held thereby. Fig. 7 is a broken-away view of a foot-pad with means of connection to one of the electrodes. Fig. 8 is an elevational view of a massage spiral roller with handle adapted to fit into the holder. Fig. 9 is an elevation of a facial massage hollow-roller attachment. Fig. 10 is an elevation of a bipart nose-contact attachment. Fig. 11 illustrates a comb attachment. Fig. 12 illustrates a contact for insertion in the cavities of the body.

The same letters of reference indicate corresponding parts in all the figures alike.

A indicates the battery, having contact $a$, and B indicates the induction-coil, which comprises a hollow core B', having the opposite end insulation-blocks $b\ b'$, forming a spool, which carries the primary coil-winding $b^2$ and secondary coil-winding $b^3$. Insulation, as a coat of paint or a wrapping-paper, is interposed between the core and the primary coil and between the primary and secondary coils. The wound magnet is loosely contained within a cylindrical housing C, of hard rubber or other insulating material, the block $b$ forming a cap therefor and said housing having a slot $c$ formed therein, while the opposite head or block $b'$ is of less diameter to permit a tubular sheath D to slide over the magnet to normally inclose said magnet, the outer end $d$ of sheath D being closed and serving as a handle by which the sheath may be withdrawn or pushed inwardly to graduate the intensity of the current. The sheath D, with its handle $d$, is pressed out of a single piece of sheet metal.

As seen in Fig. 2, a sleeve E, of rubber, fiber, or other non-conducting material, is arranged to fit removably over the battery A and the initial contact mechanism, said sleeve having a slot $e$ formed therein. Opposite electrodes F G, consisting of elongated hollow caps or tubular sheaths, inclose the induction-coil B and battery A, the same fitting slidably, but snugly, over opposite ends of the sleeve E and the electrode F, having an aperture $f$ in its closed end to permit the passage of the sheath D. The opposing ends of said electrodes do not meet, the tubular sheaths being of such length that when pushed home in setting up the apparatus they are separated over the sleeve E by an intervening space $e'$.

About the sheath D and between housing C and the inner end of electrode F, I place a friction-washer $d'$, which is preferably of soft rubber and serves to frictionally hold the sheath D in position, said friction-washer being backed by a loose metallic washer $d^2$.

A spring-contact tongue $h$ is secured to the block $b$ and arranged to bear tensionally against electrode F, the free end of said tongue emerging through slot c in housing C for that purpose. An opposite tongue I is secured at i to the block b and, passing between the sleeve E and battery A, is extended through slot e to have contact with the electrode G.

Now, to describe the means for excitation of the coils by the battery, it is pointed out that J indicates a plate or bridge, of large or considerable area, secured upon the block b and arranged so that when the parts of my apparatus are fitted together said bridge is in permanent connection with the battery-contact a.

K indicates an automatic spring-contact tongue, whose tension inclines it to lie against a regulator-strip L, which latter has a contact-point l, capable of adjustment with relation to a vibrator M, that extends over the end of the magnetic core B'. The spring-tongue K is held normally out of contact with regulator L by an idle rod N, that is passed through an aperture n in the block b, one end of said rod N (which is enlarged at n' to prevent its withdrawal through the groove n) serving to hold contact K away from regulator L when the tubular sheath D being seated bears against the other end of said rod; but when the tubular sheath D is withdrawn only slightly the tension communicated through rod N is relieved and the spring-tongue K automatically makes contact through regulator L with vibrator M, whereupon the magnetic field is energized and the electric current flows to the opposite electrodes F G through the contacts h I.

As indicated at Figs. 5 and 6, I provide an attachment-holder consisting of a collar O, adapted to fit over the end of one of the electrodes, as G, said collar having a socket, as o, adapted to receive a uniform handle, forming part of each of the attachments which I employ. The collar O may also have a diaphragm o', against which a sponge $o^2$ may be placed and by means of holes $o^3$ sewed thereto. The operator holding the apparatus by the electrode F may apply the sponge, moistened with any medicament, if desired, to such parts of his body as needed, thus affording the twofold application of electricity and medication. Another attachment is the pad P, having a hook p, whose shank is fitted in a socket p' and curved so that it may be connected to one of the electrodes F or G, being sprung thereover. I may employ two of these pads P, connecting them one to each of the electrodes, whereby the pads themselves form opposite terminals, and a person may stand with one foot upon each pad to receive electrical treatment through his pedal extremities. The pad P consists of crossed or woven wires, preferably in the form of a casing, which is filled with a mass of extremely fine wires, as $p^2$, forming a yielding mat, which provides an active dispersional electrical effect. The pad or mat P may be enlarged or elongated to form a band or other device to be placed about the body, as at the waist, thus constituting an improved electric belt.

The massage-roller (illustrated in Fig. 8) is in form of a spiral wire Q, having a central straight wire core q, by the ends of which it is pivoted in sockets q', formed in opposite semitwisted arms $q^3$ of a yoke $q^2$, from which a handle $q^5$ extends, the latter being curved and adapted to fit within socket o of holder O.

The small roller R (seen in Fig. 9) is hollow and formed of two parts r r' to contain a fluid which exudes from pin-holes $r^2$, which register when the nicks $r^3$ $r^4$ are in line upon using the roller, as for facial massage. The roller is pivotally held in its wire yoke-handle $r^5$, which latter is curved and arranged to fit into socket o.

In Fig. 10 is shown a pair of nose-nippers with curved wire handle, being especially devised to apply electricity to the delicate nerves near the nose, such treatment being beneficial in catarrhal complaints.

Fig. 11 illustrates a comb with semitwisted handle s to fit into holder O and enabling the user to apply electricity to the scalp.

The contact shown in Fig. 12 is in rod form with rounded end and is preferably of carbon. It is intended for insertion in the cavities of the body to apply electric treatment locally.

I am aware that divers other attachments may be employed in conjunction with my apparatus, and do not wish to be limited to those shown in this application, particularly with respect to the means of connecting attachments without wires directly upon one of the terminals or electrodes of the apparatus itself.

Having now described my invention, I declare that what I claim is—

1. An electrical device for treating the human body, the same being self-contained in compact form, and including a battery, an induction-coil, and opposite terminals consisting of inclosing shells; together with a holder upon one of the terminals, and divers attachments, each having a like handle to fit separately in said holder.

2. An electrical device of the character described and in cylindrical form, together with a holder arranged to fit removably upon one of the terminals, and the uniform handle of one or other of a number of attachments.

3. An electrical device of the character described and in cylindrical form, together with a holder arranged to fit removably upon one of the terminals, and to support a sponge and the uniform handle of one or other of a number of attachments, arranged to fit removably in said holder.

4. In an electrical device of the character described, and including a battery and an induction-coil inclosed within two opposite casings forming electrodes, one of said casings having an end opening to receive a tubular magnet sheath or regulator, having an operating-handle, and a friction-washer about the tubular regulator to hold it frictionally in a desired position.

5. In an electrical device of the character described and including a battery and an induction-coil inclosed within two opposite casings, forming electrodes, said induction-coil consisting of a tubular core with a head of non-conductive material at each end thereof, forming a spool for the windings, one of said heads bearing the contact mechanism, a removable slotted housing for said induction-coil, and an aperture in one of said heads to contain an idle rod to make and break contact with the battery.

6. In an electrical device of the character described, a battery, an induction-coil within a slotted housing, and having an enlarged head, a sleeve inclosing said battery and the contact mechanism, two opposing, inclosing tubular sheaths, forming electrodes, a battery-contacting bridge of large area upon said coil-head, a vibrator over the magnetic core, a regulator, and a spring-tongue in normal contact with the regulator; an idle rod extending through the coil-head and impinging against the spring-contact tongue, and a tubular sleeve, with handle, to inclose the coils, which sleeve, when closed, serves to press the idler against the spring-tongue to force the latter out of contact with the regulator, but when withdrawn, permitting said spring-tongue to automatically make contact.

In testimony whereof I have signed my name to this specification, in the presence of two subscribing witnesses, this 8th day of March, 1901.

LOUIS PETICH.

Witnesses:
F. W. BARKER,
W. H. STULD.